United States Patent
Lim et al.

(10) Patent No.: US 7,258,728 B2
(45) Date of Patent: Aug. 21, 2007

(54) APPARATUS AND METHOD FOR CLEANING AIR

(75) Inventors: Chang-Su Lim, Osan-si (KR); Yo-Han Ahn, Yongin-si (KR); Suk-Hee Im, Suwon-si (KR); Sun-Wook Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 343 days.

(21) Appl. No.: 10/920,404

(22) Filed: Aug. 18, 2004

(65) Prior Publication Data

US 2005/0039600 A1 Feb. 24, 2005

(30) Foreign Application Priority Data

Aug. 20, 2003 (KR) ............... 10-2003-0057426

(51) Int. Cl.
*B01D 46/00* (2006.01)
(52) U.S. Cl. ............... 95/287; 55/356; 55/471; 55/482; 55/485
(58) Field of Classification Search ............ 95/273, 95/286, 287; 55/471, 356, 482, 485, 467, 55/473, 385.2, 321, 315, 324, 362
See application file for complete search history.

(56) References Cited

U.S. PATENT DOCUMENTS 5,078,764 A * 1/1992 Lutterbach et al. ........... 55/356
5,230,723 A * 7/1993 Travis et al. ................... 96/57
5,433,763 A 7/1995 Shagott et al.
5,626,820 A * 5/1997 Kinkead et al. ............ 422/122

FOREIGN PATENT DOCUMENTS

| KR | 2001-0077363 | 8/2001 |
|---|---|---|
| KR | 10-2004-0035092 | 4/2004 |
| KR | 10-2005-0013858 | 2/2005 |

* cited by examiner

*Primary Examiner*—Duane Smith
*Assistant Examiner*—Sonji Turner
(74) *Attorney, Agent, or Firm*—Lee & Morse, P.C.

(57) ABSTRACT

An apparatus for cleaning air, and a method for cleaning air using the apparatus, includes a housing including an air inlet through which air to be cleaned flows into the housing and an air outlet through which air that has been cleaned is exhausted from the housing, the housing isolating an interior thereof from external surroundings. A first filtering unit is disposed adjacent to the air inlet and includes a plurality of first filters for removing a first group of contaminants from the air to be cleaned. Each of the plurality of first filters is disposed substantially parallel to each other. A fan for drawing the air to be cleaned into the housing from the external surroundings is disposed in the housing.

18 Claims, 7 Drawing Sheets

APPARATUS AND METHOD FOR CLEANING AIR

BACKGROUND OF THE INVENTION

1. Field of the Invention

The present invention relates to an apparatus and a method for cleaning air. More particularly, the present invention relates to an apparatus and method for locally cleaning air in a particular area of a clean room, which has been locally contaminated.

2. Description of the Related Art

Generally, an ultrahigh-precision device, such as a semiconductor device, is manufactured in a clean room in which contaminants exceeding a predetermined size are removed. A level of cleanliness of the clean room has a significant effect on the manufacturing yield of the semiconductor device. A single particle of contamination may cause a process failure in a semiconductor process. Recently, technology is trending toward a semiconductor device having a high degree of integration and a large size wafer. Accordingly, a clean room for manufacturing such a semiconductor device requires a higher level of cleanliness.

When an excessive amount of a contaminant is present in the clean room or is distributed throughout the clean room by an unexpected accident, a process failure may result on all of the wafers in the clean room. Furthermore, the presence of the excessive amount of contaminant necessitates stopping the manufacturing process in the clean room to avoid causing a process failure and causes damage to various semiconductor device manufacturing instruments, e.g., a filter in the clean room. When the contaminant is a poisonous gas, an operator working in the clean room may be injured or even killed by the poisonous gas. Therefore, when a contamination accidentally occurs in the clean room, rapid control of the contaminant is needed to prevent injuries or process failures caused by the contaminant.

A conventional operation of a clean room for manufacturing a semiconductor device will now be described.

First, air flows into an external air cleaner, which includes a filter unit. The air is filtered by the filter unit in the air cleaner and flows into a plenum below a floor of a clean room. The air in the plenum circulates above a ceiling of the clean room and is additionally filtered at the ceiling of the clean room before flowing into the clean room. A plurality of chemical filters and air filters is installed at each circulating sector in the clean room, and the air is repeatedly filtered. In general, about 30% of clean air in the clean room is exhausted out of the clean room during the circulation in the clean room, and new external air is provided to replace the exhausted air. The supplemented external air also flows into the clean room after being filtered, and circulates around the clean room.

The above-described air cleaning of the clean room operates normally under normal conditions. When contamination accidentally occurs in the clean room, however, the chemical filter installed at the circulating sector may not be able to adequately filter an excessive amount of contaminant. Thus, when a contamination accidentally occurs locally, i.e., at a particular area of the clean room, the concentration of the contaminant in that area becomes high enough to exceed a filtering capacity of the filter unit of the clean room. Therefore, the contaminant may not be contained to the local area of the clean room and may spread throughout the clean room.

Conventionally, in the event of a contamination, about 50% of the filtered air in the clean room is exhausted out of the clean room and is replaced with new external air to prevent the contamination of the clean room.

FIG. 1 is a graph illustrating a chlorine gas concentration as a function of time when a high concentration of chlorine gas is instantaneously leaked into the clean room. In FIG. 1, the horizontal line represents a time at which the chlorine gas concentration is measured, and the vertical line represents a measured concentration of the chlorine gas in the clean room. As shown in FIG. 1, even though the chlorine gas is leaked into the clean room in a very short period of time, the chlorine gas rapidly spreads throughout the clean room within a few minutes.

The chlorine gas concentration was measured with respect to time as follows in FIG. 1.

| Time | Concentration (ppm) |
| --- | --- |
| 11:06 | 0.67 |
| 11:09 | 2.96 |
| 11:14 | 3.03 |
| 11:17 | 2.13 |
| 11:19 | 1.55 |
| 11:21 | 1.32 |
| 11:23 | 1.17 |

FIG. 2 is a graph illustrating a concentration of residual chlorine gas as a function of time when air in the clean room is forcibly exhausted after a chlorine gas leak in the clean room. The residual gas concentration was measured at each bay of the clean room and a concentration in each bay is indicated by a corresponding one of several plots in FIG. 2, the leak occurring in the bay represented by the plot ♦. In FIG. 2, the horizontal line represents a time at which the residual gas concentration is measured, and the vertical line represents a measured concentration of the residual chlorine gas remaining at each bay of the clean room after the leakage of the highly concentrated chlorine gas. As shown in FIG. 2, even though the air in the clean room is forcibly exhausted and external air is supplied into the clean room, recovery of the normal concentration, i.e., return to an acceptable level of concentration of contamination, from the excessively high concentration requires at least two hours.

Therefore, a conventional air cleaning system that forcible exhausts air from the clean room requires too long a period of time to reduce the contaminant concentration to a normal degree after a contamination accident in the clean room. Moreover, initial control of the contamination is very difficult when the contaminant, e.g., a contaminating gas, is rapidly spreading. In addition, since the forcible exhaustion of the contaminant is performed, not by removing the contaminant alone, but by circulating all of the air in the clean room, a disadvantage of the conventional air cleaning system is that the contaminant may be distributed throughout the entire clean room.

SUMMARY OF THE INVENTION

The present invention is therefore directed to an air filter apparatus and a method of cleaning air using the same, which substantially overcome one or more of the problems due to the limitations and disadvantages of the related art.

It is a feature of an embodiment of the present invention to provide an air filter apparatus that is capable of locally controlling a contamination, e.g., a contaminant gas, in a clean room. It is another feature of an embodiment of the present invention to provide a method of locally controlling a contamination, e.g., a contaminant gas, in a clean room.

It is still another feature of an embodiment of the present invention to provide an air filter apparatus or a method of cleaning air that uses a plurality of filters to clean contamination even though an overall amount of the contamination may exceed a filtering capacity of an individual filter alone.

It is yet another feature of an embodiment of the present invention to provide an air filter apparatus or a method of cleaning air that is mobile so that removal of locally contaminated air in the clean room without circulating all of the air of the clean room is enabled, thereby preventing the contaminant from being spread throughout the clean room.

At least one of the above and other features and advantages of the present invention may be realized by providing an apparatus for cleaning air including a housing including an air inlet through which air to be cleaned flows into the housing and an air outlet through which air that has been cleaned is exhausted from the housing, the housing isolating an interior thereof from external surroundings, a first filtering unit disposed adjacent to the air inlet and including a plurality of first filters for removing a first group of contaminants from the air to be cleaned, each of the plurality of first filters being disposed substantially parallel to each other, and a fan for drawing the air to be cleaned into the housing from the external surroundings, the fan being disposed in the housing.

Each of the plurality of first filters may be disposed at an angle less than about 90° with respect to a direction of air flow. Alternatively, each of the plurality of first filters may be disposed at substantially a right angle with respect to a direction of air flow.

Each of the plurality of first filters may be disposed in an individual space, so that the air to be cleaned passing through each of the plurality of first filters is independently cleaned by one of the plurality of first filters.

The first filtering unit may include a plurality of separating walls for defining a plurality of spaces so that only one of the plurality of first filters is disposed in each of the plurality of spaces and a filter support for supporting a corresponding one of the plurality of first filters, the corresponding one of the plurality of first filters being disposed on the filter support in one of the plurality of spaces at a predetermined angle with respect to a bottom surface of the housing.

The apparatus may additionally include a second filter for removing a second group of contaminants, the second filter being disposed adjacent to the air outlet. The second filter may be a high efficiency particulate air (HEPA) filter or an ultra low pneumatic air (ULPA) filter.

The apparatus may additionally include a plurality of casters for facilitating movement of the housing, the plurality of casters being positioned on a bottom surface of the housing.

The apparatus may additionally include a control unit for controlling a revolution speed of the fan, the control unit being connected to the fan.

The apparatus may additionally include a medium filter positioned within the housing between the air inlet and the first filtering unit.

The apparatus may additionally include a flexible duct for drawing the air to be cleaned into the air inlet, the flexible duct being extendable to an area of local contamination to minimize an amount of the air to be cleaned.

At least one of the above and other features and advantages of the present invention may be realized by providing a method of cleaning an air including receiving air to be cleaned from an area where the air is locally contaminated, removing a first group of contaminants from the received air using a plurality of first filters, each of the plurality of first filters being disposed in a path of air flow of the received air, the plurality of first filters being arranged substantially parallel to each other, and exhausting a cleaned air, from which the first group of contaminants has been removed by the plurality of first filters, to external surroundings.

In the method, the received air may be divided between each of the plurality of first filters, and each of the plurality of first filters independently removes the first group of contaminants from a divided portion of the received air. The received air may flow into each of the plurality of first filters at an angle less than about 90° with respect to the path of air flow of the received air.

The method may further include removing a second group of contaminants from the received air using a second filter after removing the first group of contaminants.

In either the apparatus or the method, the first group of contaminants may include gaseous or chemical materials. The second group of contaminants may have a particle shape. Each of the plurality of first filters may be a chemical filter.

According to an embodiment of the present invention, locally contaminated air is equally divided and filtered by a plurality of filters arranged substantially parallel to each other, so that an amount of contaminants within a filtering capacity of each filter may be filtered even though an overall amount of the contaminants may exceed a filtering capacity of an individual filter alone. In particular, in a clean room for fabricating a semiconductor device, locally contaminated air in the clean room may be removed from the clean room without circulating all of the air of the clean room, thereby preventing the contaminant from being spread throughout the clean room. The present invention may also be applicable to any other field, i.e., other than the semiconductor industry that is known to one of the ordinary skill in the art as requiring clean air.

BRIEF DESCRIPTION OF THE DRAWINGS

The above and other features and advantages of the present invention will become readily apparent to those of ordinary skill in the art by reference to the following detailed description when considered in conjunction with the accompanying drawings, in which.

DETAILED DESCRIPTION OF THE INVENTION

Figure 1:
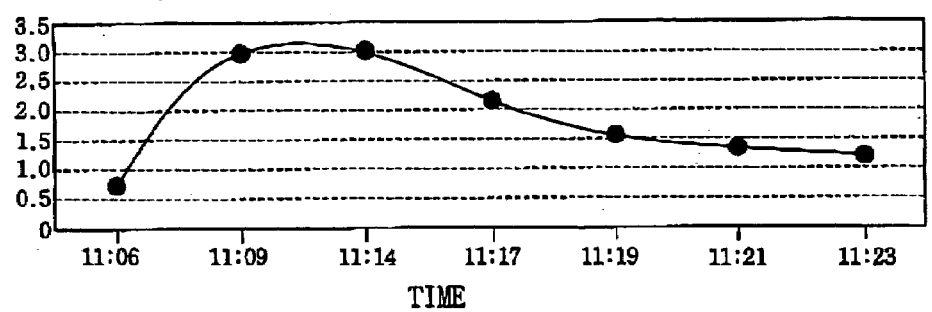
FIG. 1 is a graph illustrating a concentration of a contamination, in this exemplary case, chlorine gas, as a function of time when a high concentration of the contaminant is instantaneously leaked into a clean room.
Figure 2:
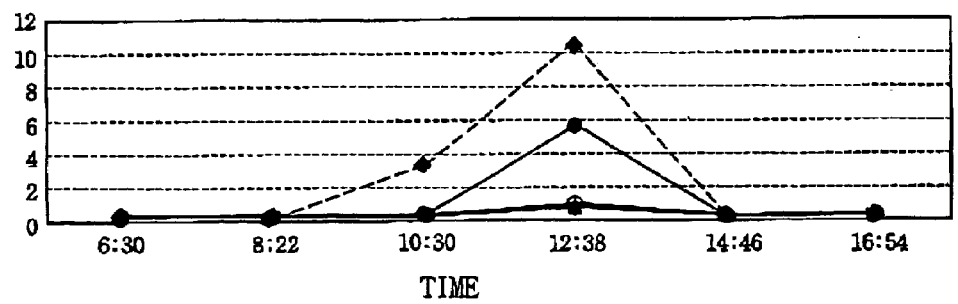
FIG. 2 is a graph illustrating a residual concentration of a contaminant, in this case, chlorine gas, as a function time when the air in the clean room is forcibly exhausted after a leakage of the contaminant into the clean room.

Korean Patent Application No. 2003-57426, filed on Aug. 20, 2003, in the Korean Intellectual Property Office, and entitled: "Apparatus and Method for Cleaning Air," is incorporated by reference herein in its entirety.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout.

Figure 3:
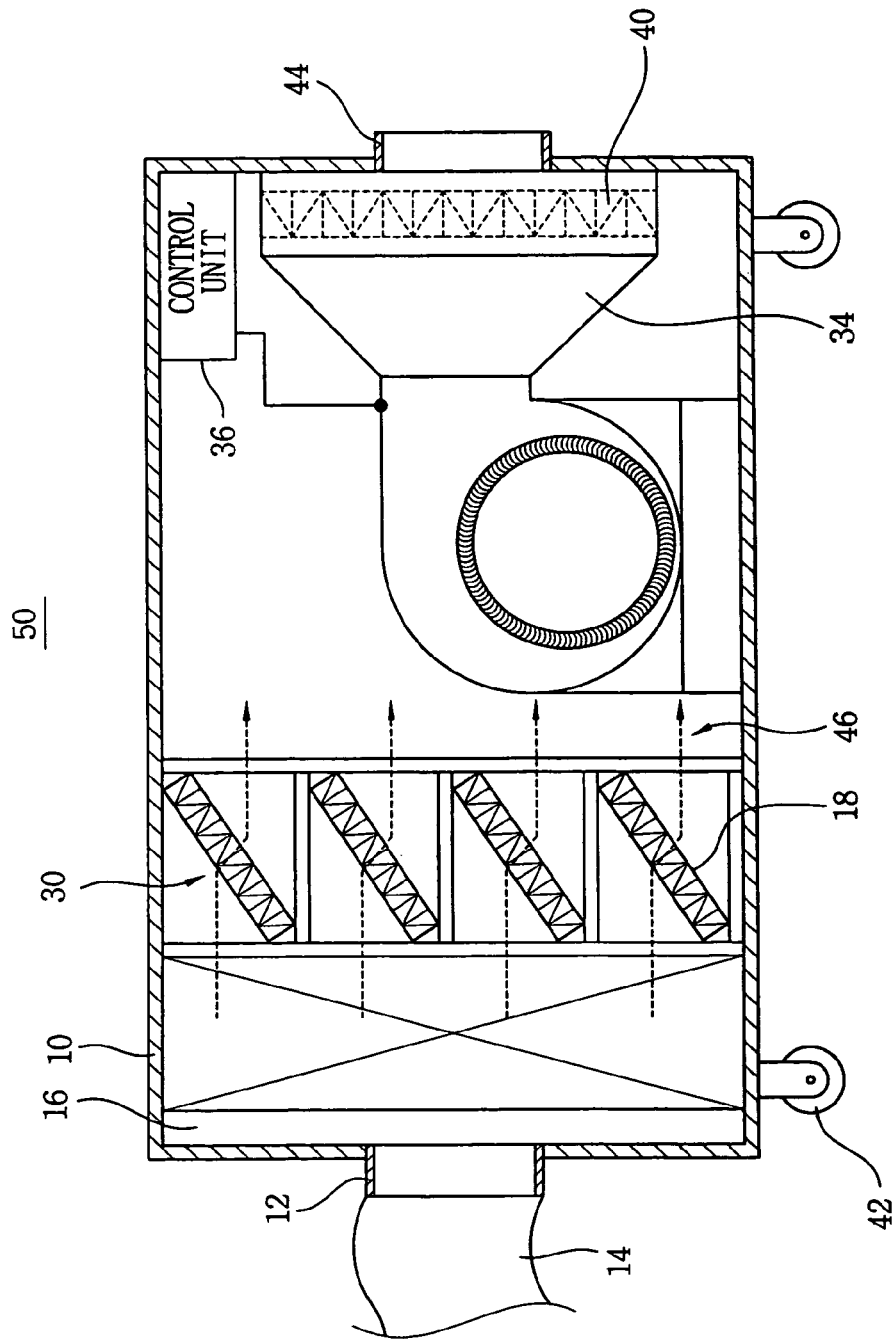
FIG. 3 schematically illustrates a cross-sectional view of an apparatus for cleaning air according to an exemplary embodiment of the present invention and a movement of air through the apparatus.
Figure 4:
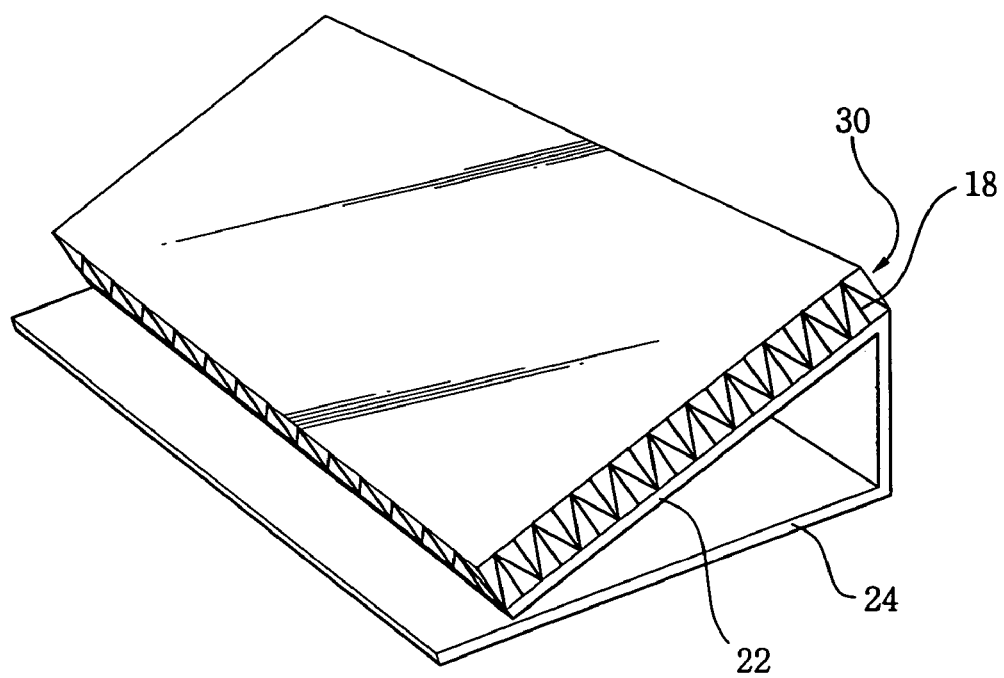
FIG. 4 illustrates a perspective view of a portion of a first filtering unit shown in FIG. 3.

FIG. 3 schematically illustrates a cross-sectional view of an apparatus for cleaning air according to an exemplary embodiment of the present invention and movement of air through the apparatus. FIG. 4 illustrates a perspective view of a portion of a first filtering unit shown in FIG. 3.

Referring to FIG. 3, an apparatus 50 for cleaning air includes a housing 10 having a frame and a plurality of covers installed at each surface of the frame. The housing 10 isolates an interior of the apparatus 50 from external surroundings to define the interior of the apparatus wherein the filtering process, i.e., the cleaning of the air, is performed.

An air inlet 12, through which air to be cleaned flows into the apparatus 50, is installed at a side of the housing 10. A flexible duct 14 is connected to the air inlet 12. In the event of a local contamination, the flexible duct 14 is extended to the locally contaminated area of the clean room, and air including a contaminant, e.g., a contaminating gas, in the clean room is drawn into the apparatus 50 through the flexible duct 14.

A medium filter 16 may be optionally installed in the housing 10 adjacent to the air inlet 12. The medium filter 16 removes about 90% of the minute dust from the air that flows in through the air inlet 12. A first filtering unit 30 is disposed at a backside of the medium filter 16, relative to a direction of air flow, i.e., the direction at which air enters the apparatus 50 through the air inlet 12. The first filtering unit 30 includes a plurality of first filters 18, each having a same size and shape. Each of the plurality of first filters 18 is disposed substantially parallel to each other. In an exemplary embodiment of the present invention, each of the plurality of first filters 18 is obliquely disposed at an angle less than about 90°, e.g., about 45°, with respect to the direction of air flow. Alternatively, each of the plurality of first filters 18 may be disposed substantially perpendicular, i.e., at a right angle, to the direction of air flow.

In an exemplary embodiment, each of the plurality of first filters 18 is a chemical filter for removing a first group of contaminants, e.g., chemical or gaseous materials, from the air. The first group of contaminants is primarily gas materials that may include an ozone gas, nitrogen oxides, sulfuric oxides, a chlorine gas and an ammonia gas, which may be used in the manufacturing process of a semiconductor device. Each of the plurality of first filters 18 is disposed in an individual space defined by a separating wall (24 of FIG. 4), so that the air that flows into each of the plurality of first filters 18 is independently filtered.

The first filtering unit 30 is explained in greater detail with reference to FIG. 4.

Referring to FIG. 4, the first filtering unit 30 is disposed facing the air inlet 12, i.e., in the path of the air flowing into the housing 10, and includes a plurality of separating walls 24 for dividing the space in which the plurality of first filters 18 is positioned so that each first filter 18 is separated from an adjacent first filter 18. More specifically, only one of the plurality of first filters 18 is positioned in each space defined by the separating walls 24.

A filter support 22 is additionally disposed in each space defined by the separating walls 24, and supports a corresponding first filter 18 by contacting a lower surface of the first filter 18. The filter support 22 is inclined with respect to the direction of airflow at an angle less than about 90°, so that the first filter 18 positioned on the filter support 22 is disposed obliquely with respect to the direction of airflow.

Accordingly, the air flow passing through the air inlet 12 is divided into a plurality of sub-flows corresponding to each of the plurality of first filters 18, so that the contaminants in the air that flowed in through the air inlet 12 are filtered by each of the plurality of first filters 18 independently. The first filter 18, which may be a kind of chemical filter, generally removes the first group of contaminants, e.g., chemical or gaseous materials, by an ion exchange. Thus, the first group of contaminants may not be sufficiently removed from the air when the air includes an excessive amount of contaminants and exceeds the filtering capacity of a single first filter 18. Therefore, the air containing the contaminants should be divided between each of the plurality of first filters 18 so that an amount to be filtered may be within the filtering capacity of each filter to immediately control the contamination.

Each of the plurality of first filters 18 is disposed substantially parallel to each other so that the air passing through the air inlet 12 is not concentrated into one filter, but rather is equally distributed among the plurality of first filters 18. The airflow through each first filter 18 is represented by arrows 46 as shown in FIG. 3. In addition, the airflow is also distributed over an entire surface of each of the plurality of first filters 18 since each filter 18 is inclined at an angle less than about 90° with respect to direction of airflow. Accordingly, a contact area of each of the plurality of first filters 18 for making contact with the air is also increased because of the oblique arrangement of each of the plurality of first filters 18.

Therefore, the substantially parallel arrangement of the plurality of first filters 18 causes the air containing the contaminant to be divided between each filter, so that the amount of contamination to be filtered by any one filter may remain within the filtering capacity, thereby increasing the control efficiency of the contamination.

A fan 34 is installed at a rear portion of the housing 10, relative to the direction of airflow, to induce exterior air to be cleaned into the housing and to exhaust the filtered air out of the housing 10 and back into the clean room.

A control unit 36 is connected to the fan 34 and controls a revolution speed of the fan 34. Control of the revolution speed regulates an amount of air supplied to the housing 10.

A second filter 40, e.g., a high efficiency particulate air (HEPA) filter or an ultra low pneumatic air (ULPA) filter may be installed at a rear portion of the fan 34 to remove minute dust from the air. A HEPA filter may remove particles having a particle size of about 0.3 μm from the air with an efficiency of about 99.97%. An ULPA filter may remove particles having a particle size of about 0.1 μm from the air with an efficiency of about 99.9999%. The ULPA filter is superior as the second filter 40 to the HEPA filter because of a higher filtering ability. However, when the clean room does not require such a high level of cleanliness, a HEPA filter may be utilized as the second filter 40.

The second filter 40 removes contaminants, not by using the ion exchange as do the plurality of first filters 18, but rather by using a piling-up and absorption process, so that the filtering capacity of the second filter 40 is relatively less influenced by the amount of the contaminants as compared with the first filters 18 even though the amount of the contaminants exceeds the filtering capacity. As a result, the second filter 40 is not formed in a substantially parallel structure, as is the first filtering unit 30.

Casters 42 are installed on a bottom surface of the housing 10 for facilitating movement of the apparatus 50 to the area of local contamination. Accordingly, the apparatus for cleaning air according to this embodiment of the present invention is mobile.

An air outlet 44 is disposed at a rear portion of the second filter 40 for exhausting the air out of the housing 10. Thus, air may be discharged out of the housing 10 after having passed through the first and second filters 18 and 40.

An advantage of the present invention is that when air in a clean room is locally contaminated due to a contamination event, the air filtering apparatus may control the contaminated air without circulating all of the air in the clean room.

A method of controlling and filtering air in a clean room using the apparatus for cleaning air according to an embodiment of the present invention will now be disclosed.

Figure 5:
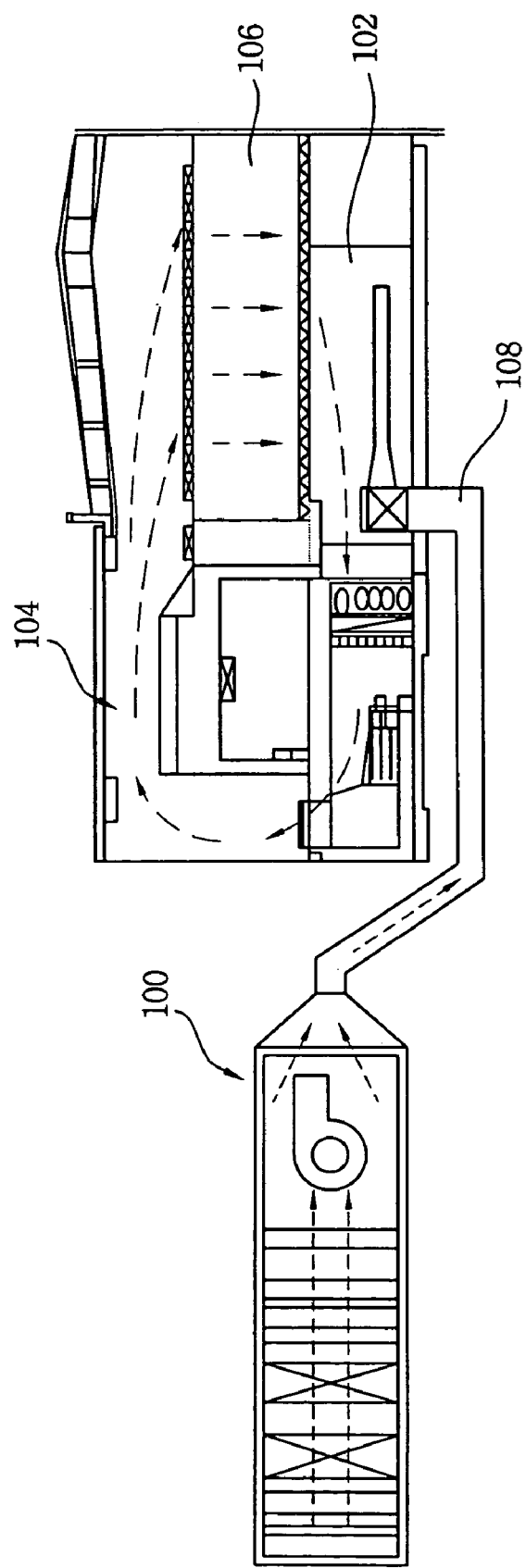
FIG. 5 schematically illustrates a cross-sectional view of a process of air cleaning according to an exemplary embodiment of the present invention.

FIG. 5 schematically illustrates a cross-sectional view of the process for air cleaning according to an exemplary embodiment of the present invention.

The cleaning system includes an external air cleaner 100 having a plurality of filter units, a plenum 102 disposed under a floor of a clean room 106, an air channel 104 through which the air is circulated from the plenum 102 to the ceiling of the clean room 106, and the clean room 106 in which a process in the manufacture of a semiconductor device is performed. A plurality of bays, in which various manufacturing processes are performed, is arranged in the clean room 106.

In operation, external air passes through the external air cleaner 100, and particles in the external air are removed by the external air cleaner 100. In particular, the external air is changed into a cleaning air while passing through the external air cleaner 100. The cleaning air moves to the plenum 102 through an air duct 108. The air in the plenum 102 moves over the ceiling of the clean room 106 through the air channel 104. Then, the air over the ceiling is supplied into the clean room 106 after filtering. The air in the clean room 106 moves down and again gathers in the plenum 102 through a lower grating disposed on a floor of the clean room. Subsequently, the air gathering in the plenum 102 again moves over the ceiling of the clean room 106, and is supplied into the clean room 106. Accordingly, the air in the plenum 102 circulates through the clean room 106 and the plenum 102.

When a contamination occurs in an arbitrary bay in the clean room 106, a concentration of contaminants may be locally very high around that bay. Examples of a contamination event may include a gas leak or a chemical leak. The contaminants primarily include ozone, nitrogen oxides, sulfuric oxides, chlorine and ammonia, which are essential components of gas or chemical compounds utilized in the clean room.

When a contamination occurs, the air cleaning apparatus 50 according to an embodiment of the present invention is moved to the area of contamination within the clean room. Because the air cleaning apparatus 50 includes casters 42, the apparatus 50 is mobile and an operator may easily move the air cleaning apparatus 50 to the area of contamination.

Subsequently, the air inlet 12 is placed in proximity to the area of contamination, and the fan 34 is activated. Resultantly, the contaminated air in the clean room 106 is drawn into the housing 10 of the air cleaning apparatus of the present invention and cleaned.

Figure 6:
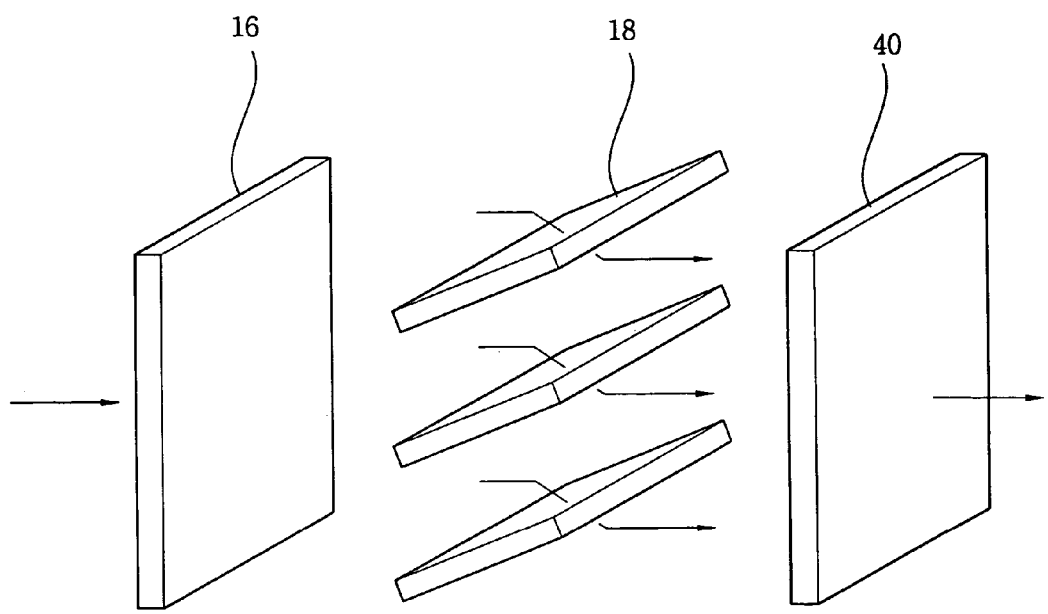
FIG. 6 schematically illustrates a cleaning process in the apparatus for cleaning air according to the present invention.

FIG. 6 schematically illustrates a view of a cleaning process in the air cleaning apparatus according to an exemplary embodiment of the present invention.

Referring to FIG. 6, air drawn into the housing initially passes through the medium filter 16 to primarily remove minute dust in the air.

Then, the airflow is divided in accordance with a plurality of first filters 18, so that a substantially equal portion of the inhaled air flows to each of the plurality of first filters 18. The plurality of first filters 18 is positioned at an angle less than about 90° with respect to the direction of air flow and is arranged so that each of the plurality of first filters 18 is substantially parallel to each other.

Each of the plurality of first filters 18 removes a first group of contaminants, e.g., gaseous and chemical materials, from the introduced air. The control unit 36 controls the fan 34, and regulates an amount and velocity of air drawn in such that an amount of the contaminant in the air is below the filtering capacity of each of the plurality of first filters 18.

The introduced air separately flows to each of the plurality of first filters 18 and is individually filtered at each of the plurality of first filters 18. Accordingly, the introduced air may be filtered within the filtering capacity of each of the plurality of first filters 18 even though the introduced air contains an excessive amount of the first group of contaminants, i.e., above the filtering capacity of each of the first filters 18. In addition, since the plurality of first filters 18 are obliquely inclined at an angle less than about 90° with respect to the direction of air flow and are substantially parallel to each other, the air flows into entering surfaces of the plurality of first filters 18 at a predetermined angle, and flows out from exiting surfaces of the plurality of first filters 18 at a predetermined angle after filtering. The contact area between the air and the plurality of first filters 18 is increased due to the oblique arrangement of the plurality of first filters 18, so that an excessive concentration of air at a particular area of the plurality of first filters 18 is prevented. As a result, locally excessive contamination at a particular area of the plurality of first filters 18 is minimized.

After the first group of contaminants has been removed by the plurality of first filters 18 from the air around the contamination area, a second group of contaminants, e.g., dust particles, in the air is removed by the second filter 40. In an exemplary embodiment, the second filter 40 includes a HEPA filter or an ULPA filter. Finally, the air is exhausted through the air outlet, and supplied into the plenum below the clean room.

As mentioned above, the clean air in the plenum is circulated by the external air cleaning system of the clean room. That is, clean air is provided into the clean room and flows down into the clean room and is collected in the plenum. The collected air in the plenum is moved above the ceiling of the clean room through the air channel, and is again provided into the clean room.

Resultantly, contaminants may be removed from the air in the clean room without circulating all of the air when the air in the clean room is locally contaminated due to a contamination accident. Moreover, the contamination accident may be rapidly resolved without having to exchange all of the air in the clean room using the external air cleaning system of the clean room.

Experiments

Figure 7A:
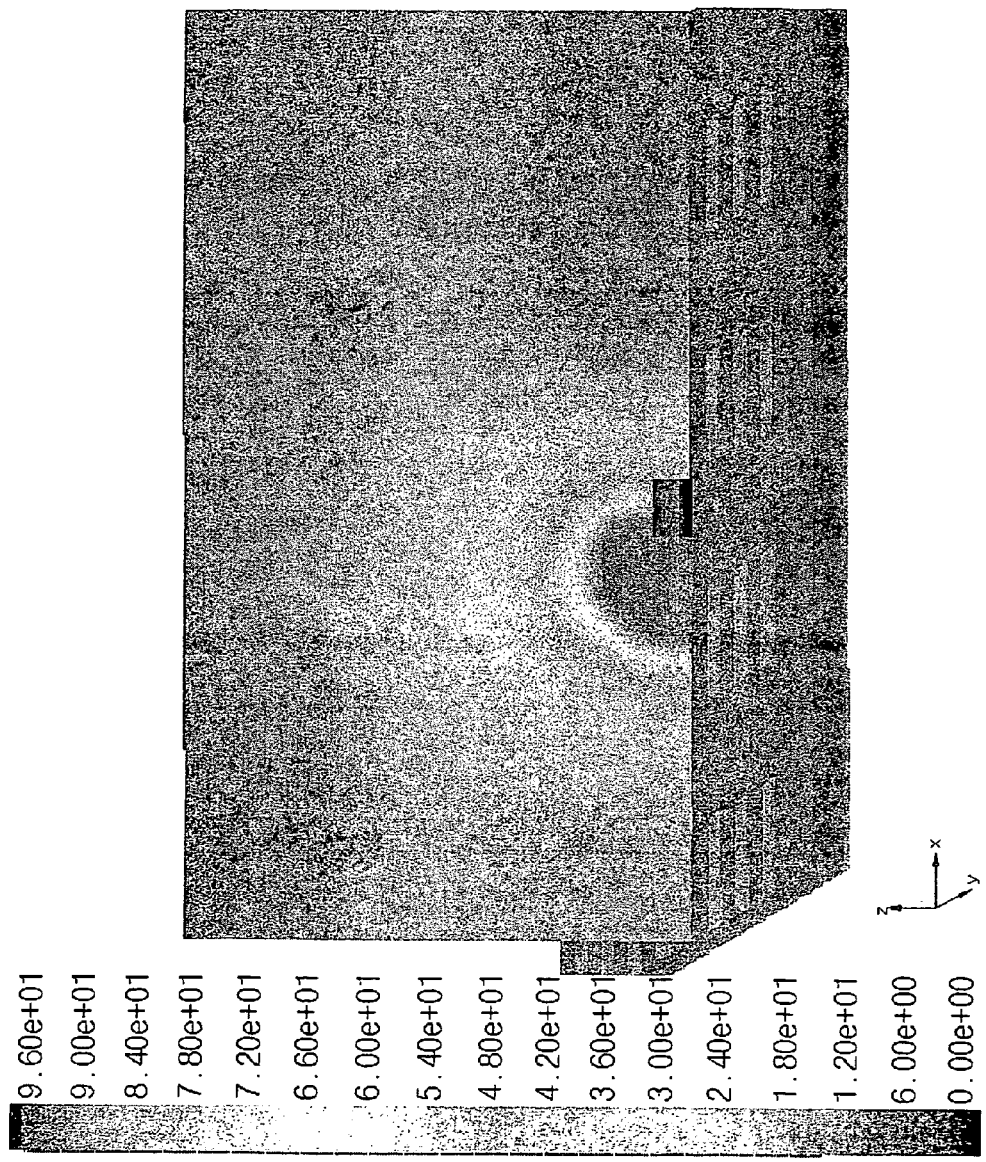
FIG. 7A illustrates a view of a concentration of contaminants in a clean room without the apparatus for cleaning air shown in FIG. 3 when a contamination accident occurs in the clean room.
Figure 7B:
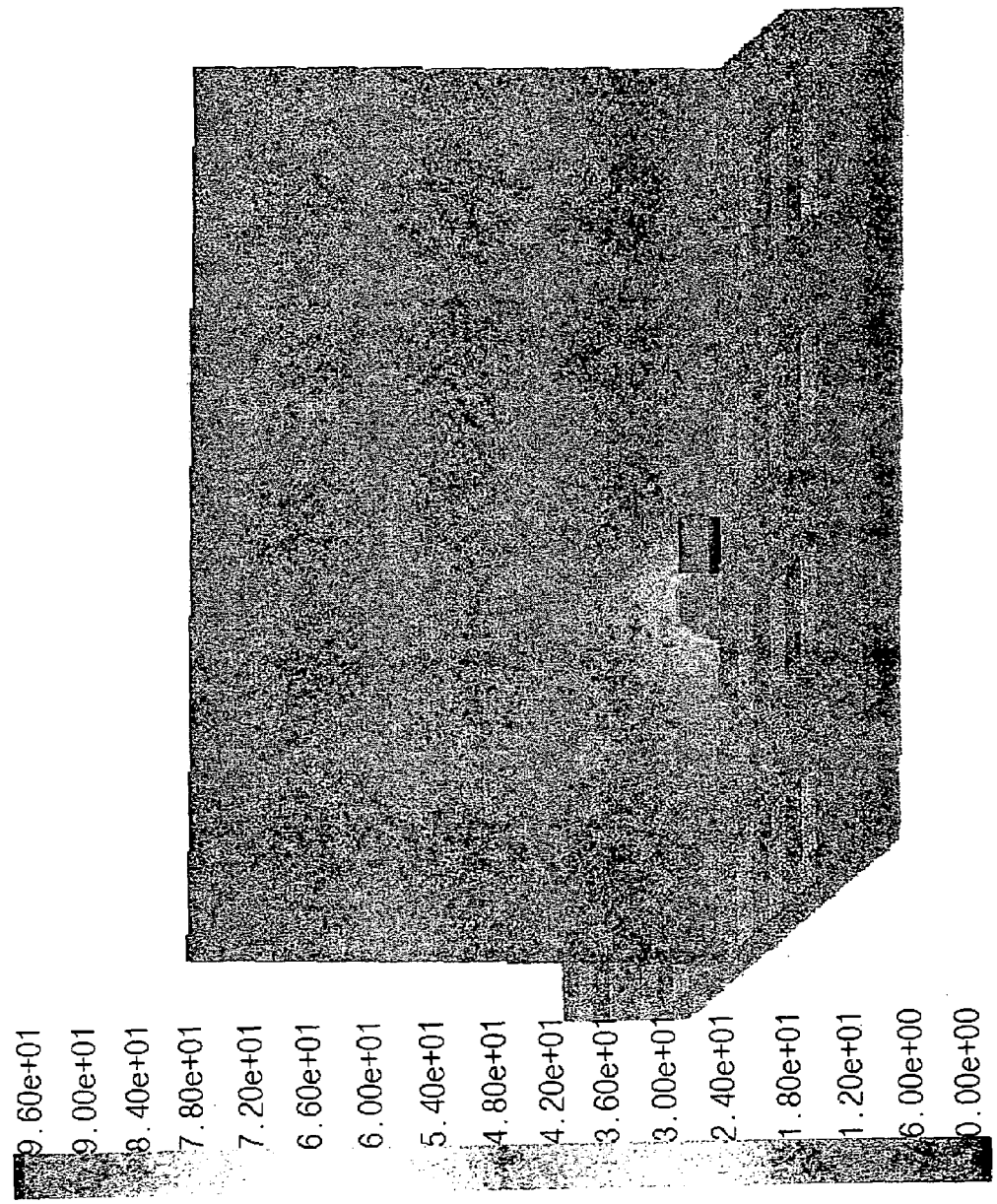
FIG. 7B illustrates a view of a concentration of contaminants in a clean room including the apparatus for cleaning air shown in FIG. 3 when the contamination accident occurs in the clean room.

FIG. 7A is a view illustrating a concentration of a contaminant in a clean room without the apparatus for cleaning air shown in FIG. 3. FIG. 7B is a view illustrating a concentration of a contaminant in a clean room including the apparatus for cleaning air shown in FIG. 3. In both instances, the contamination has occurred in the clean room.

Conditions of the Experiment

Conditions of the Clean Room

| | |
|---|---|
| Size of the clean room | 22.8 m × 9.6 m × 4.2 m (length × width × height) |
| Air velocity of the filter | 0.4 m/s |
| Acceptable concentration of the contaminant | Chlorine gas ($Cl_2$) of 0 parts per billion (ppb) |

Conditions of the Contamination

| | |
|---|---|
| Contamination area | 600 mm × 600 mm |
| Concentration and velocity of the contaminant | Chlorine gas ($Cl_2$) of 1000 ppb and 0.01 m/s |

Conditions of the Air Cleaning Apparatus

| | |
|---|---|
| Amount and velocity of the inhaled air | 648 cubic meters per second (CMS) at 2 m/s, 972 CMS at 3 m/s, 1296 CMS at 4 m/s, and 1620 CMS at 5 m/s |
| Size of the air inlet | 300 mm × 300 mm |
| Cleaning efficiency | 100% |

When chlorine gas ($Cl_2$) was accidentally leaked at a particular area of the clean room, and the air cleaning apparatus of the present invention was not installed in the clean room, the chlorine gas ($Cl_2$) widely spread out to a neighboring area adjacent to the area of contamination as shown in FIG. 7A. Therefore, all of the air in the clean room became contaminated, and as a result, all of the wafers in the clean room became contaminated with chlorine gas ($Cl_2$). In contrast, when chlorine gas ($Cl_2$) was accidentally leaked at a particular area of the clean room, and the air cleaning apparatus of the present invention was installed in the clean room, the chlorine gas ($Cl_2$) was only able to spread out in a vicinity of the area of contamination as shown in FIG. 7B.

The comparison between FIGS. 7A and 7B indicates that the air cleaning apparatus according to an embodiment of the present invention prevents a contamination from spreading and quickly reduces a concentration of the contaminant in the clean room.

According to the present invention, the locally contaminated air may be removed from the clean room without circulating all of the air, thereby preventing the contaminant from spreading throughout the clean room. Thus, a process failure caused by the contamination may be prevented. In addition, loss of productivity due to non-operation of the clean room advantageously decreases when a time to clean contaminated air is minimized.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for cleaning air, comprising:
a housing including an air inlet through which air to be cleaned flows into the housing and an air outlet through which air that has been cleaned is exhausted from the housing, the housing isolating an interior thereof from external surroundings;
a first filtering unit disposed adjacent to the air inlet and including a plurality of first filters for removing a first group of contaminants from the air to be cleaned, each of the plurality of first filters being disposed substantially parallel to each other; and
a fan for drawing the air to be cleaned into the housing from the external surroundings, the fan being disposed in the housing,
wherein each of the plurality of first filters is disposed at an angle less than about 90° with respect to a direction of air flow.

2. The apparatus as claimed in claim 1, wherein each of the plurality of first filters is disposed in an individual space, so that the air to be cleaned passing through each of the plurality of first filters is independently cleaned by one of the plurality of first filters.

3. The apparatus as claimed in claim 1, wherein the first filtering unit comprises:
a plurality of separating walls for defining a plurality of spaces so that only one of the plurality of first filters is disposed in each of the plurality of spaces; and
a filter support for supporting a corresponding one of the plurality of first filters, the corresponding one of the plurality of first filters being disposed on the filter support in one of the plurality of spaces at a predetermined angle with respect to a bottom surface of the housing.

4. The apparatus as claimed in claim 1, wherein each of the plurality of first filters is disposed at substantially a right angle with respect to a direction of air flow.

5. The apparatus as claimed in claim 1, wherein the first group of contaminants comprises gaseous or chemical materials.

6. The apparatus as claimed in claim 1, wherein each of the plurality of first filters is a chemical filter.

7. The apparatus as claimed in claim 1, further comprising a second filter for removing a second group of contaminants, the second filter being disposed adjacent to the air outlet.

8. The apparatus as claimed in claim 7, wherein the second filter is a high efficiency particulate air (HEPA) filter or an ultra low pneumatic air (ULPA) filter.

9. The apparatus as claimed in claim 7, wherein the second group of contaminants has a particle shape.

10. The apparatus as claimed in claim 1, further comprising a plurality of casters for facilitating movement of the housing, the plurality of casters being positioned on a bottom surface of the housing.

11. The apparatus as claimed in claim 1, further comprising a control unit for controlling a revolution speed of the fan, the control unit being connected to the fan.

12. The apparatus as claimed in claim 1, further comprising a medium filter positioned within the housing between the air inlet and the first filtering unit.

13. The apparatus as claimed in claim 1, further comprising a flexible duct for drawing the air to be cleaned into the air inlet, the flexible duct being extendable to an area of local contamination to minimize an amount of the air to be cleaned.

14. A method of cleaning air, comprising:
   receiving air to be cleaned from an area where the air is locally contaminated;
   removing a first group of contaminants from the received air using a plurality of first filters, each of the plurality of first filters being disposed in a path of air flow of the received air, the plurality of first filters being arranged substantially parallel to each other; and
   exhausting cleaned air, from which the first group of contaminants has been removed by the plurality of first filters, to external surroundings,
   wherein each of the plurality of first filters is disposed at an angle less than about 90° with respect to a direction of air flow.

15. The method as claimed in claim 14, wherein the received air is divided between each of the plurality of first filters, and each of the plurality of first filters independently removes the first group of contaminants from a divided portion of the received air.

16. The method as claimed in claim 14, wherein the first group of contaminants comprises gaseous or chemical materials.

17. The method as claimed in claim 14, further comprising removing a second group of contaminants from the received air using a second filter after removing the first group of contaminants.

18. The method as claimed in claim 14, wherein the second group of contaminants has a particle shape.

* * * * *